United States Patent [19]

Allard et al.

[11] Patent Number: 5,104,466
[45] Date of Patent: Apr. 14, 1992

[54] NITROGEN GAS GENERATOR

[75] Inventors: John E. Allard, North Ogden; Linda M. Rink, Liberty, both of Utah

[73] Assignee: Morton International, Inc., Chicago, Ill.

[21] Appl. No.: 685,777

[22] Filed: Apr. 16, 1991

[51] Int. Cl.⁵ .............................................. C06G 45/03
[52] U.S. Cl. ..................................... 149/21; 149/35; 149/61; 149/110; 149/112; 280/741
[58] Field of Search ............... 149/21, 35, 61, 110, 149/112; 280/741

[56] References Cited

U.S. PATENT DOCUMENTS 3,785,674  1/1974  Poole et al. ..................... 149/35
4,533,416  8/1985  Poole ............................... 149/35

Primary Examiner—Stephen J. Lechert, Jr.
Attorney, Agent, or Firm—Gerald K. White

[57] ABSTRACT

Particles of glass or silica type material are added to pellets of gas generating material as the gas generating material is being loaded into the combustion chamber of a gas generator or inflator. When the inflator is fired, the liquids and gases produced by the resulting rapid combustion process are cooled and condensed by the particles of glass or silica type material to a solid inside the combustion chamber near the exit ports or outlet holes thereof. This dramatically reduces the amount of combustible particle residue or particulates that leave the inflator.

10 Claims, 4 Drawing Sheets 5,104,466

NITROGEN GAS GENERATOR

BACKGROUND OF THE INVENTION

1. Field of the Invention

This invention relates to the mixture with a solid combustible gas generant composition of an ingredient for the rapid generation of an exceedingly clean gas that is substantially free of combustion particle residue and extraneous noxious and offensive odors. The invention has particular utility in gas generators or inflators used for the generation of nitrogen gas to inflate vehicle inflatable cushion or air bag restraint systems to protect the occupants, passengers as well as the driver, from severe impact and possible injury during a collision.

2. Description of the Prior Art

In the prior art the amount of combustion particle residue or particulate leaving the inflator, when fired, has posed a problem. This particulate is due to liquids and gases that are produced by the pyrotechnics during combustion of a solid gas generant composition. Various chemical and mechanical cooling and filtering arrangements that have been proposed have been incapable of reducing the particle residue contained in the inflation gas to a desirably low level for the avoidance of discomfort to the vehicle occupants who are intended to be spared severe impact during a collision.

It is the practice to provide such filtering arrangements in a separate chamber in the gas flow path between the combustion chamber and the inflator outlet. Typical United States patents disclosing such filtering arrangements are U.S. Pat. No. 3,985,076, granted Oct. 12, 1976 and U.S. Pat. No. 4,296,084, granted Oct. 20, 1981, both of which patents have been assigned to the assignee of the present invention.

Gas generating compositions have been proposed that include mixtures of metal azides, oxidant metal compounds, and oxides of materials such as silicon dioxide. The oxide is said to react with and transform the toxic solid combustion residue to a non-toxic or physiologically harmless residue, specifically a glasslike alkali silicate when the oxide is silicon dioxide. United States patents that disclose such compositions are U.S. Pat. No. 3,883,373, granted May 13, 1975 and U.S. Pat. No. 3,947,300, granted Mar. 31, 1976. In U.S. Pat. No. 3,883,373 the components or ingredients of the gas generating composition are described as being employed in particulate form, in particle size less than 100 mesh Tyler screen size. The components in U.S. Pat. No. 3,947,300 are described as being ground and pulverized as finely as possible and highly dispersed and then compressed to form the composition. Such compositions leave something to be desired because of difficulty in uniformly mixing silicon dioxide with the metal azide and oxidant compound as required to react the silicon dioxide with the residues and for obtaining satisfactory combustibility.

Gas generant compositions that burn with the production only of the desired gaseous product and a solid product in the form of a sinter or clinker that is retained in the generator housing have also been proposed in the prior art. Such compositions are described in several United States patents as follows: U.S. Pat. No. 3,895,098, granted July 15, 1975, U.S. Pat. No. 3,931,040, granted Jan. 6, 1976, U.S. Pat. No. 3,996,079, granted Dec. 7, 1976, and U.S. Pat. No. 4,062,708, granted Dec. 13, 1977. In the disclosures of these patents the compositions are described as comprising mixtures of metal oxides such as nickel oxide or iron azide, and an alkali metal azide. A particle size for the reactant oxide in the range of a small fraction of a micron to a few microns is indicated as essential for effecting a burning rate fast enough for inflating an inflatable occupant restraint system.

Efforts to make an operative gas generator utilizing gas generating compositions as described above have been unsuccessful. The problems encountered include difficulty in compacting the mixture to form a stable pellet and difficulty in igniting the mixture.

It has been found that pelletizing the gas generating composition is essential for the composition to remain reliable over extended periods of ten (10) years or more, such as are involved in the useful life of a vehicle in which an air bag protective restraint system is intended to be installed, and for providing a uniform surface area for uniform burning upon ignition of the composition. Otherwise the burning rate is not predictable. Additionally, without pelletizing there is a tendency for packing and separation of the finely divided particles after the gas generator has been subjected to vibration over an extended period of time, as occurs during ordinary use, particularly when installed on a vehicle.

Gas generant compositions in pelletized form that have been found to be suitable for the rapid generation of nitrogen gas as required for the deployment of vehicle air bag restraint systems are disclosed in several United States patents that are assigned to the assignee of the present invention. These include U.S. Pat. No. 4,203,787, granted May 20, 1980 and U.S. Pat. No. 4,369,079, granted Jan. 18, 1983, the disclosures of which patents are incorporated herein by reference. While the gas generating pelletized material disclosed in these patents meet the requirements of burning rate, non-toxicity, and flame temperature, the amount of particle combustion residue in the generated gas is greater than is desirable, at least for some applications, even with the use of filtering arrangements provided in the gas flow path between the combustion chamber and the generator output, and has continued to pose a problem.

Thus, there still exists a need and a demand for further improvement in solid fuel gas generators or inflators particularly for the generation of clean nitrogen gas that is substantially free of combustible residue for inflating vehicle inflatable cushion or air bag restraint systems, or stated more specifically, to reduce the amount of particle combustible residue that flows out of the generator or inflator with the generated nitrogen gas into the inflatable cushion or air bag.

SUMMARY OF THE INVENTION

An object of the invention is to provide, for use as the fuel in a gas generator or inflator, an improved mixture including, as an ingredient, pellets composed of an alkali metal azide and an oxidizing compound, which mixture, when ignited, is characterized by a substantial increase in the amount of particle combustion residue, sometimes referred to as "particulates," that is retained within the combustion chamber of the inflator and a concomitant reduction in the amount of such particle combustion residue in the gas flow out of the inflator.

Another object of the invention is to provide an improved mixture for generating nitrogen gas having particular utility for inflating an inflatable cushion of a vehicle occupant restraint system, which mixture consists essentially of the following ingredients:
  a. an alkali metal azide;
  b. an oxidizing compound in proportion sufficient to react substantially completely with the azide with the liberation of nitrogen therefrom, with the azide and oxidizing compound being fabricated in the form of pellets each of which individually has a geometric configuration such that when aggregated in a mass there is contained between the pellets an unoccupied or free volume made up of the spaces between the pellets; and
  c. discrete particles of glass or silica type material which are substantially smaller than the pellets, which such particles being disposed amongst the pellets and substantially filling the free volume therebetween. Another object of the invention is to provide a simple and efficient means to substantially reduce the amount of particle combustion residue that exits the combustion chamber of a gas generator or inflator wherein the fuel is a pelletized solid combustible gas generant composition.

Still another object of the invention is to provide an improved inflator for inflating an inflatable cushion of a vehicle restraint system in response to a vehicle collision signal comprising:
  housing means defining at least one discharge port for directing a gaseous flow from the housing means,
  gas generating means disposed within the housing means and including a mixture comprised of ingredients, as follows:
    a. an alkali metal azide,
    b. an oxidizing compound in proportion sufficient to react substantially completely with the azide with the liberation of nitrogen therefrom with the azide and the oxidizing compound being fabricated in the form of pellets each of which individually has a geometric configuration such that when aggregated in a mass there is contained between the pellets a free volume made up of the spaces therebetween, and
    c. discrete particles of glass or silica type material which are substantially smaller than the pellets, said particles being disposed amongst the pellets and substantially filling the free volume therebetween; and
  means operable to thermally initiate said gas generating means in response to the collision signal.

In accomplishing these and other objectives of the invention, glass or other silica type material is added to gas generant in pellet form as the pellets are loaded into the combustion chamber of the inflator, filling the spaces, that is, the unoccupied or free volume that is available between the pellets. When the inflator is fired, that is, thermally initiated or activated, liquid and/or extraneous gases produced by the rapid combustion process or pyrotechnics are cooled and condensed to a solid mass inside the combustion chamber and are trapped therein. This greatly reduces the amount of combustion particle residue or particulates in the generated gas flow out of the inflator.

The composition of the gas generant pellets may be any one of a number of compositions that are readily compacted to form a stable pellet and meets the requirements of burning rate, non-toxicity and flame temperature. Compositions that may be utilized are disclosed in the aforementioned U.S. Pat. Nos. 4,203,787 and 4,369,079.

The various features of novelty that characterize the invention are pointed out with particularity in the claim that are annexed to and form a part of this specification. For a better understanding of the invention, its operating advantages and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DETAILED DESCRIPTION OF THE PREFERRED EMBODIMENT

Figure 1:
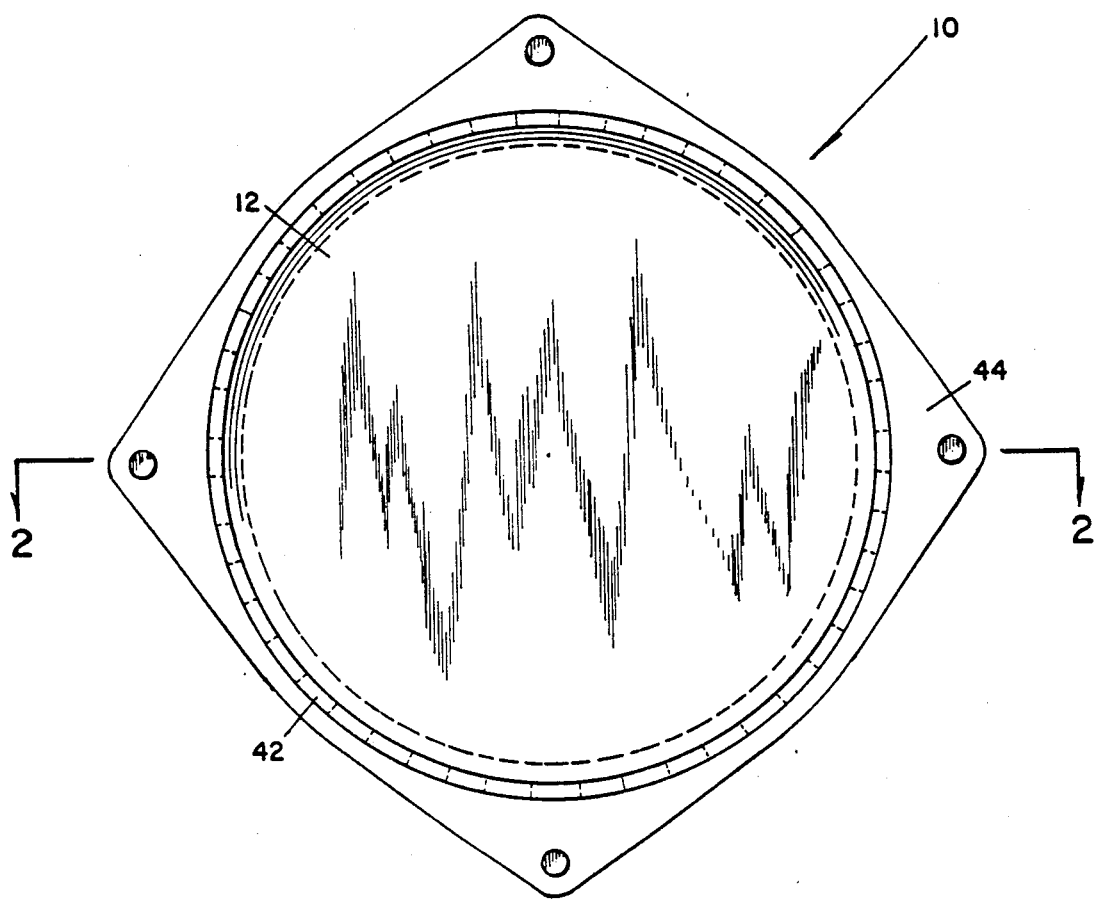
FIG. 1 is a top plan view of an improved inflator in which the present invention is embodied.

The structure of the gas generator or inflator assembly indicated at 10 in the drawings may be of the type disclosed in U.S. Pat. No. 4,561,675, granted Dec. 31, 1985 and assigned to the assignee of the present invention. By reference thereto, the disclosure of U.S. Pat. No. 4,561,675 is incorporated herein.

Figure 2:
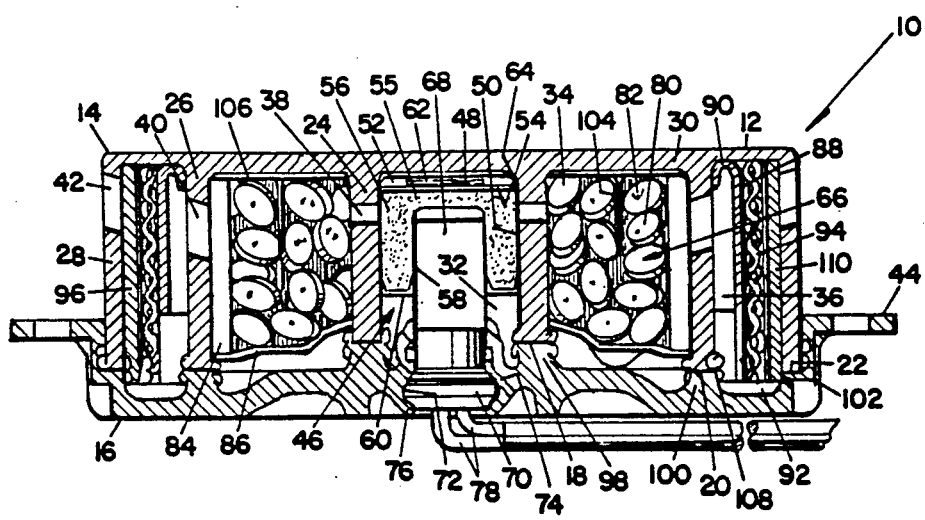
FIG. 2 is a cross sectional view of the inflator of FIG. 1 taken along the lines 2—2, and illustrates the uniform mixture of the gas generant pellets and silica type particles of material in the combustion chamber of the inflator before firing, that is, thermal initiation.

As best seen in FIGS. 1 and 2, the inflator assembly 10 has a generally cylindrical external outline and includes a housing construction 12 comprising two structural components. These components comprise an upper shell or diffuser 14 and a lower shell or base 16 which may be made of aluminum for light weight and are joined by three concentric inertia welds indicated at 18, 20 and 22. The three inertia welds are performed simultaneously in a single inertia welding operation.

The diffuser 14 may be formed by forging with three concentric cylinders 24, 26 and 28 which extend downwardly from a common flat upper wall 30 to form a separate weld interface with the base 16. The inner cylinder 24, in cooperation with the wall 30 and base 16, forms a cylindrical igniter chamber 32. The intermediate cylinder 26, in cooperation with the inner cylinder 24, wall 30, and base 16, form an inner chamber having the shape of a toroid, specifically a combustion chamber 34. The outer cylinder 28, in cooperation with the intermediate cylinder 26, wall 30, and base 16, forms an outer chamber 36 that also has the shape of a toroid. Cylinders 24, 26 and 28 each include a plurality of uniformly spaced exhaust openings or ports 38, 40 and 42, respectively, through which the generated inflation gas flows into a vehicle inflatable cushion or air bag (not shown). The base 16 includes an interface attachment 44 which is used to attach the inflator assembly 10 to a vehicle the occupants of which are to be protected from injury tending to result from the impact of a collision.

An igniter charge assembly 46 is positioned within the igniter chamber 32. Mounted on the assembly 46 is a sub-assembly comprising an auto ignition device 48. Igniter charge assembly 46 includes two cylindrical containers, one designated 50 and the other 52, with the container 52 comprising part of the sub-assembly 48. Container 52 includes a relatively wide brim 54, being hat shaped, and is positioned in an inverted and sealed manner in the upper and open end of container 50.

Container 50 contains an igniter material 56. The bottom of container 50 which is closed, and in which a recess 58 is formed, rests on a retaining ring 60 which is held in press fit engagement with the cylindrical wall surface of igniter chamber 32. Positioned between the igniting material in container 50 and brim 54 of container 52 may be a spacer pad 55 made of cerafiber.

Container 52 contains an igniter material 62. Sealing between the containers 50 and 52 may be effected by a suitable sealant such as silicone rubber, properly cured in known manner. The edge 64 of the open end of container 50 may be rounded to conform to the shape of the igniter chamber 32 adjacent the wall 30 with the surface of container 52 remote from the brim 54 in good thermal contact with the adjacent surface of wall 30.

Although various pyrotechnic materials may be employed for igniter material 56, a preferred material is a granular mixture of 25% by weight of boron and 75% of potassium nitrate plus or minus 10% of lead azide. This mixture has been found to burn with a very hot flame that is suitable for igniting the solid fuel gas generant material employed in the inflator assembly 10, as described hereinafter.

The igniter material 62 in container 52 may be any granule, powder or other material which is stable for long duration at temperatures up to 250° F. (121° C.), will auto ignite at a desired temperature of about 350° F. (177° C.), and provide a hot gas/effluent output sufficient to ignite the igniter material 56 in container 50. An igniter material 62 that has been found to be satisfactory is Dupont 3031, a product of E. I. duPont de Nemours & Co., Inc. of Wilmington, De.

The purpose of the sub-assembly comprising auto ignition device 48 is to ignite the pyrotechnics, that is, the igniter material 56 in container 50 and gas generant material 66 in the combustion chamber 34 of the inflator 10 at a temperature which is lower than the ignition temperatures thereof in case of inflator exposure to a fire during shipment, storage in a warehouse, or after installation in an automobile so as to prevent ignition of the pyrotechnics when the aluminum of the inflator housing structural components 14 and 16, because of such exposure, has degraded and may, as a result of such degradation, tend to rupture and burst.

Extending into recess 58 of container 50 is an initiator 68 that has a conically shaped lower portion 70 and is mounted in a hole 72 having a mating conically shaped upper portion 74. Hole 72, as shown in FIG. 2, is located in a central portion of base 16. Initiator 68 is retained in hole 72 by a crimp 76 that is formed in base 16 at the lower end of hole 72 and overlaps and engages the conically shaped lower portion 70 of initiator 68. Initiator 68 may be a conventional electric squib having a pair of input lead wires 78 commonly known as "pig tails" that are provided for connection to external crash sensor means (not shown). Suitable means (not shown) may be provided for sealing initiator 68 in hole 72.

In accordance with the invention, glass or silica type material in particle form indicated by the reference numeral 82 is added to the pellets 80 as the pellets 80 are loaded into the inflator, filling the spaces, that is, any free volume between the pellets 80 that is available.

Surrounding the pellets 80 and the particles of material 82 positioned amongst the pellets 80 is an inner screen pack or combustion chamber filter 84. Inner screen pack 84 may desirably include a layer of coarse screen (not shown) adjacent to the inner surface of the concentric cylinder 26. An aluminum washer-shaped retaining ring or disk 86 holds the pellets 80, the particles of material 82, and the inner screen pack 84 in place and away from the rotating base 16 during the inertia welding operation.

In the outer toroidal chamber 36, an annular aluminum deflector ring 88 is provided. Deflector ring 88 may be made of steel and is formed with an inwardly directed curved flange 90 at its upper end. Deflector ring 88 is held in press fit engagement with the outer surface of cylinder 26 at the inner end thereof adjacent wall 30 of diffuser 14. The length of deflector ring 88 is such as to provide an annular exhaust opening or port 92 at the lower end thereof.

Also included in the toroidal chamber 36 is an outer screen pack or filter 94. Screen pack 94 may desirably include a coarse layer 96 adjacent the inner surface of cylinder 28.

The inflator assembly 10 is welded in the wholly loaded condition. During the inertia welding operation, the assembly of the loaded diffuser 14 containing the loaded and sealed igniter charge assembly 46, gas generant pellets 80 with the particles of material 82 uniformly distributed there amongst, inner screen pack 84, retaining disk 86, deflector ring 88 and outer screen pack 94 is held stationary in the inertia welding machine. Retaining disk 86 holds the pellets 80 and particles of material 32 in place and also serves to keep them separated from the spinning base 16 during the inertia welding operation.

During the inertia welding operation, the base 16 is rotated beneath the loaded diffuser 14 by power driven clutch means (not shown) to a speed that, typically, may be about 3000 r.p.m. Upon the attainment of such speed, the clutch is actuated to disconnect the power source and the freely spinning base 16 is raised upwardly to bring concentric stubs 98, 100 and 102 of base 16 into contact with the lower ends of a respectively associated one of the three concentric cylinders 24, 26 and 28 of the diffuser 14. The resulting friction stops the spinning of the base 16 in a fraction of a second but raises the temperature of each of the areas of contact sufficiently to cause consolidation in such areas of the metal of the diffuser 14 and the base 16. Pressure is maintained for a short period, for example, a second or two, to allow the welds 18, 20 and 22 to solidify.

The housing construction 12 provides a structure for containing the high pressure inflation gases which are produced by combustion of the gas generant pellets 80. Normal functioning of the inflator assembly 10 begins with an electrical signal from a crash sensor (not shown) to the initiator 68 by way of the input lead wires 78. The initiator 68 fires into and pierces the closed container 50 in which igniter material 56 is contained. The igniter material 56 burns and the resulting hot gases burst through the walls of the container 50 and flows through the openings or ports 38 in the inner cylinder 24 into the combustion chamber 34. The hot igniter gases ignite the gas generant pellets 80 which burn and release the inflator gases. These gases flow through the inner screen filter pack 84 and radially outwardly through the combustion chamber openings or ports 40. The screen filter pack 84 is provided to cool the inflator gases and to remove particle combustion residue therefrom.

A baffle or inner deflector ring 104 which may be composed of aluminum or other suitable material, desirably is positioned in the combustion chamber 34, concentric, as shown, with the cylinders 24, 26 and 28, to deflect ignition gases as they pass through ports 38 thereby to prevent a blow-torch effect of the ignition gases on the inner screen filter pack 84. The baffle 104 may be positioned and held in tension by spot welding a plurality, for example, three, of spaced clips 106. The baffle 104 is spaced from the bottom of the combustion chamber 34 to allow sufficient distribution of the pellets 80 to the bottom thereof.

As the gases exit the combustion chamber ports 40, they are turned downwardly by deflector ring 88 where they strike weld flashing 108 from the intermediate cylinder inertia weld 20. The flashing 108 interrupts the gas flow which contributes to further removal of particulate matter from the exhaust gases. The inflator gases then flow radially outward through an annular exhaust opening 110 between the deflector ring 88 and the outer filter screen pack 94, through the latter, and finally, radially outward through the exit openings or outlet ports 42. The screen pack 94 serves further to cool the exhaust gases and to remove particulate matter therefrom.

As a result of the addition of the particulate glass or silica type material 82 for filling the spaces or voids between the pellets 80 in the combustion chamber 34, liquids and/or extraneous gases produced by burning of the igniter material 56 and 62 and the burning of the pellets 80 are cooled and condensed to a solid mass inside the inflator It has been found that cooling and condensation greatly reduces the amount of particulate that flows out of the combustion chamber 34 with the inflator gases, and hence, out of the inflator 10 into a protective restraint system.

EXAMPLE I

For the purpose of establishing a base line, the combustion chamber 34 of each of first, second and third inflators fabricated as illustrated in FIGS. 1 and 2 were loaded with eighty-five (85) grams of round shallow pellets 80 having a dimension of 0.25 inches in diameter and 0.10 inches thick. The composition of the pellets consisted of approximately 65.6% sodium azide ($NaN_3$), 5.1% sodium nitrate ($NaNO_3$), 28.3% iron oxide ($Fe_2O_3$) and 1% molybdenum disulfide ($MOS_2$). Each inflator was fired, in turn, into a closed, clean tank having a volume of one (1) cubic foot and the amount of combustion particle residue that had been in the inflator gas was weighed. In order to measure the weight of the particle residue in each case, a clean beaker was weighed and filled with a liter of deionized water. The water was poured into and thoroughly washed around the inside of the tank and then poured back into the beaker. After boiling off the water, the beaker was weighed again. The difference in weight of the clean beaker and that after the boiling off of the water, comprising the weight of the combustion particle residue in the inflator gas flow into the tank, was found to be 0.14 grams, 0.12 grams and 0.14 grams, respectively, for the first, second and third inflators.

Figure 4:
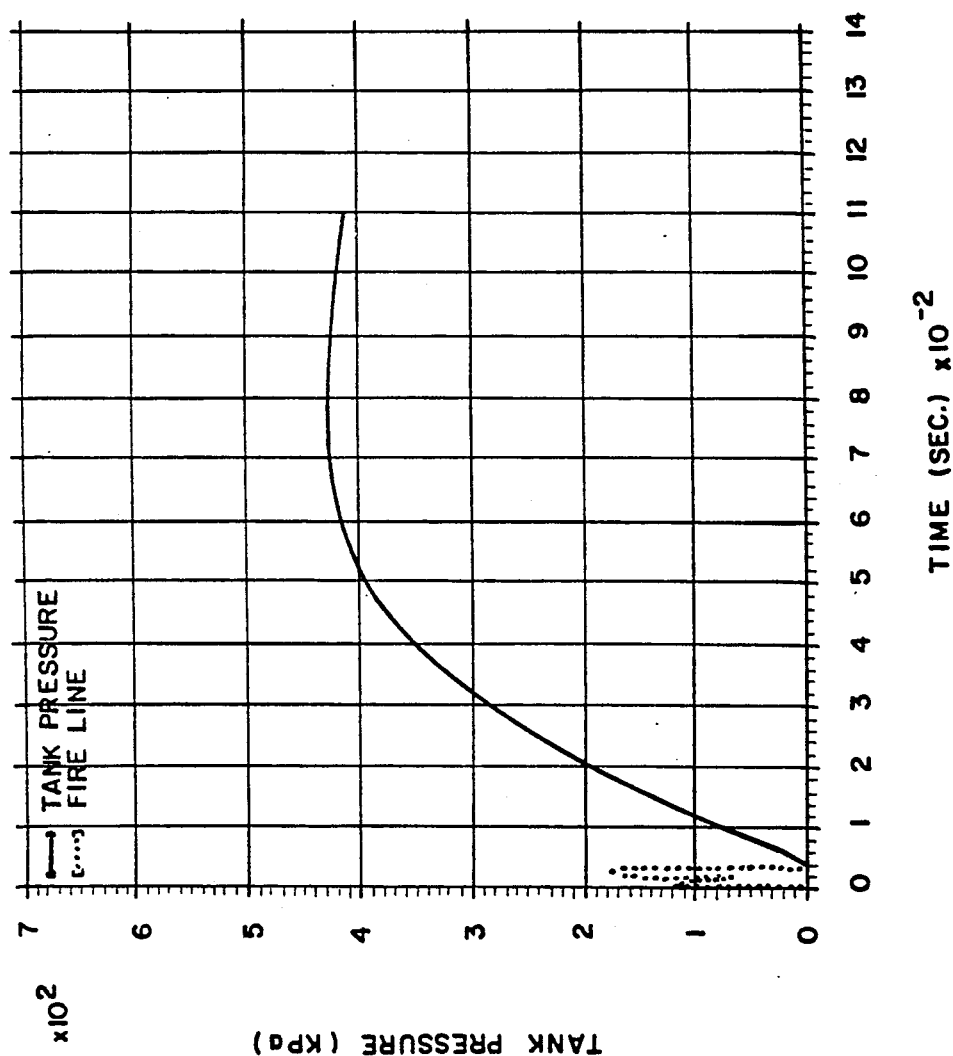
FIG. 4 is a graph illustrating the inflation rate of an inflator fabricated as illustrated in FIGS. 1 and 2 but in which the invention is not embodied.

The graph of FIG. 4 illustrates a typical time-pressure increase rate for each of the three inflators of Example I. Reference to FIG. 4 shows that the maximum pressure developed was 420 kilopascals at about seventy (70) milliseconds after firing of the inflator.

EXAMPLE II

The combustion chambers of each of fourth, fifth and sixth inflators that were fabricated as illustrated in FIGS. 1 and 2 were loaded with eighty-five (85) grams of round shallow pellets 80 having a dimension of 0.25 inches in diameter and 0.10 inches thick. Twenty (20) grams of one (1) millimeter glass beads 82 were added to the combustion chamber of each inflator and disposed amongst the pellets 80 filling the free volume around the pellets. In each case no extra volume was required since the glass beads 82 filled the free volume around the pellets 80. The composition of the pellets consisted of approximately 65.6% sodium azide ($NaN_3$), 5.1% sodium nitrate ($NaNO_3$), 28.3% iron oxide ($Fe_2O_3$) and 1% molybdenum disulfide ($MOS_2$). Each inflator was fired, in turn, into a closed, clean tank having a volume of one (1) cubic foot and the amount of the combustion particle residue that had been in the inflator gas was weighed. In order to measure the weight of the particle residue in each case, a clean beaker was weighed and filled with a liter of deionized water. The water was poured into and thoroughly washed around the inside of the tank and then poured back into the beaker. After boiling off the water, the beaker was weighed again. The difference in weight of the clean beaker and that after the boiling off of the water, comprising the weight of the combustion particle residue in the inflator gas flow into the tank, was found to be 0.06 grams, 0.04 grams and 0.02 grams, respectively, for the fourth, fifth and sixth inflators.

Each of the fourth, fifth and sixth inflators of EXAMPLE II showed a dramatic reduction in combustion particle output. Without the beads the combustion particle output averaged in excess of 0.13 grams. With the addition of glass beds the amount of combustion particles was reduced to an average of 0.04 grams.

Figure 3:
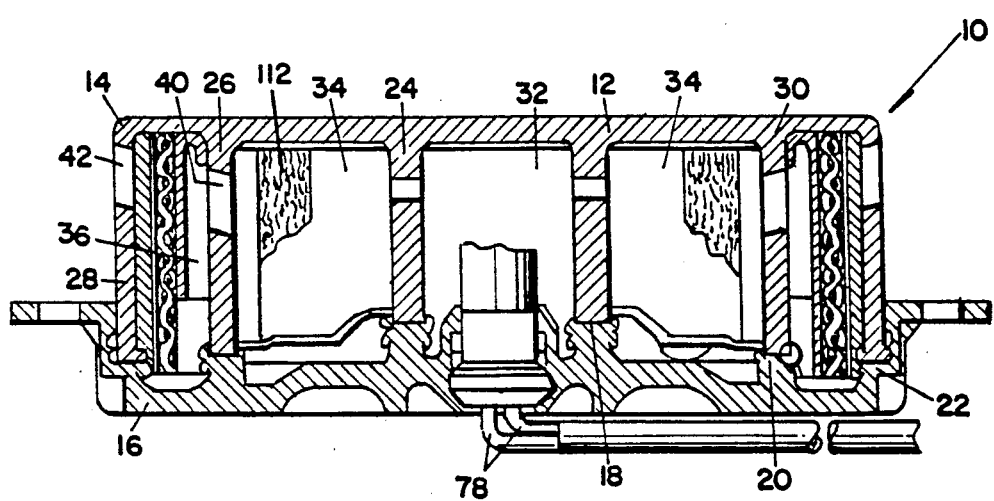
FIG. 3 is a cross sectional view similar to FIG. 2 illustrating the interior of the combustion chamber of FIG. 2 after firing.

One of the fourth, fifth and sixth inflators was sectioned, as illustrated in FIG. 3, and examined. As shown, the glass beads had cooled and condensed the liquids and gases, and produced a solid mass of particulate residue shown at 112 near the exit openings or ports 40 of the combustion chamber 34. The solidified mass 112 was trapped in the combustion chamber 34 and was not blown into the inflator outer chamber 36 and then out of the inflator outlet ports 42 as it normally would have been without the addition of the glass beads 82 to the pellets 80 in the combustion chamber 34. Close examination of the solidified mass 108 revealed particulate residue adhering to the surfaces of the beads.

Figure 5:
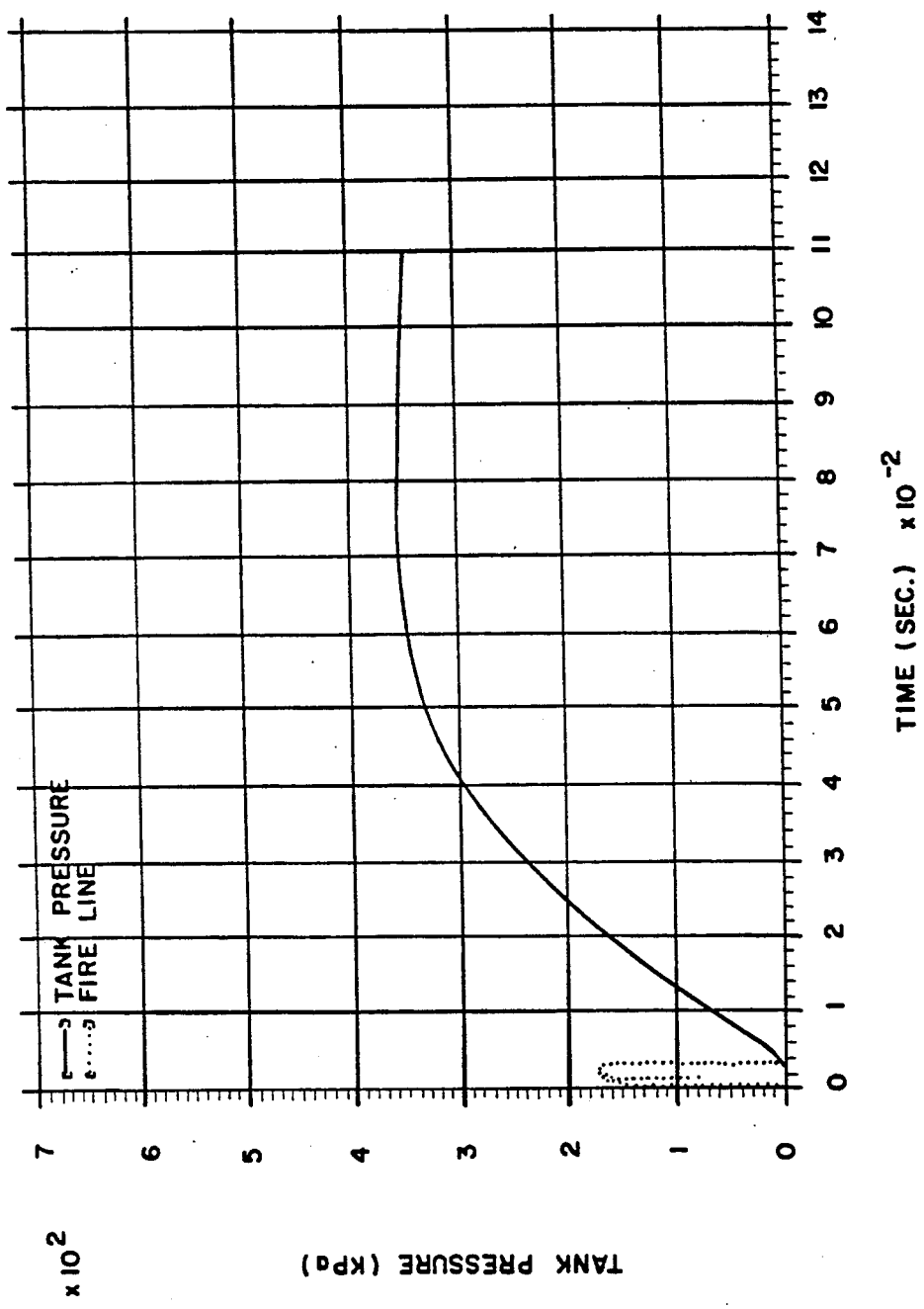
FIG. 5 is a graph illustrating the inflation rate of an inflator fabricated as illustrated in FIGS. 1 and 2 and in which the invention is embodied.

The graph of FIG. 5 illustrates a typical time-pressure increase rate for each of the three inflators of EXAMPLE II. As shown in FIG. 5, the maximum pressure developed was 360 kilopascals at about 70 milliseconds after firing of the inflator. While the maximum pressure developed is less than the pressure developed in EXAMPLE I with the use of gas generant pellets 82 only in the combustion chamber 34, the pressure of 360 kilopascals is adequate for and may advantageously be used in certain applications where the generation of cleaner nitrogen inflation gas is desired.

Thus, there has been provided a simple and efficient means for substantially reducing the amount of particulate residue that exits the combustion chamber of a gas generator or inflator and consequently is present in the generated gas wherein the fuel utilized in the combustion chamber is a solid combustible gas generant composition in the form of pellets.

There has also been provided, according to the invention, an improved mixture having utility in a gas generator or inflator, which mixture includes pellets the ingredients of which include an alkali metal azide and an oxidizing compound, and an additional ingredient comprising particles of silicon dioxide which may be in the form of glass or silica type material, which particles are uniformly disposed amongst the pellets and substantially fill the spaces or voids therebetween. The improved mixture is characterized in that when fired in the combustion chamber of a gas generator or inflator, liquids and/or extraneous gases produced by the pyrotechnics are cooled and condensed to a solid mass inside the combustion chamber, thus greatly reducing the amount of particulate matter in the desired generated gases issuing from the inflator.

With this description of the invention in detail, those skilled in the art will appreciate that modifications may be made to the invention without departing from its spirit. Therefore, it is not intended that the scope of the invention be limited to the specific embodiment illustrated and described. Rather, it is intended that the scope of the invention be determined by the appended claims and their equivalents.

What is claimed is:

1. A mixture for generating nitrogen gas consisting essentially of the following ingredients:
   a. an alkali metal azide;
   b. an oxidizing compound in proportion sufficient to react substantially completely with said azide with the liberation of nitrogen therefrom, with said azide and oxidizing compound being fabricated in the form of pellets each of which individually has a geometric configuration such that when aggregated in a mass there is contained between the pellets a free volume made up of the spaces therebetween; and
   c. discrete particles of silica containing material which are substantially smaller than said pellets, said particles being disposed amongst said pellets and substantially filling the free volume therebetween.

2. A mixture as defined by claim 1 wherein said particles of silica containing material comprises particles of glass.

3. A mixture as defined by claim 2 wherein said particles of glass comprises glass beads.

4. A mixture as defined by claim 1 wherein the geometric configuration of the pellets is round and shallow and the particles of silica type material comprise particles of glass.

5. A mixture as defined by claim 4 wherein the pellets each have a diameter of about 0.25 inches (0.635 cm.) and a thickness of about 0.10 inches (0.254 cm.), and wherein
   said particles of glass comprise one (1) millimeter glass beads.

6. An inflator for inflating an inflatable cushion of a vehicle occupant restraint system in response to a vehicle collision signal comprising:
   housing means defining at least one discharge port for directing a gaseous flow from said housing means,
   gas generating means disposed within said housing means and including a mixture comprised of the following ingredients:
   a. an alkali metal azide,
   b. an oxidizing compound in proportion sufficient to react substantially completely with said azide with the liberation of nitrogen therefrom, with said azide and said oxidizing compound being fabricated in the form of pellets each of which individually has a geometric configuration such that when aggregated in a mass there is contained between the pellets a free volume made up of the spaces therebetween, and
   c. discrete particles of silica containing material which are substantially smaller than said pellets, said particles being disposed amongst said pellets and substantially filling the free volume therebetween, and
   means operable to thermally initiate said gas generating means in response to the collision signal.

7. An inflator as defined by claim 6 wherein said particles of silica containing material comprises particles of glass.

8. An inflator as defined by claim 7 wherein said particles of glass comprise glass beads.

9. An inflator as defined by claim 6 wherein the geometric configuration of the pellets is round and shallow and the particles of silica type material comprise particles of glass.

10. An inflator as defined by claim 9 wherein the pellets each have a diameter of about 0.25 inches (0.635 cm.) and a thickness of about 0.10 inches (0.254 cm.) and said particles of glass comprise one (1) millimeter glass beads.

* * * * *